US007622527B2

(12) United States Patent
Ito et al.

(10) Patent No.: US 7,622,527 B2
(45) Date of Patent: Nov. 24, 2009

(54) POLYMERIC MATERIAL HAVING POLYROTAXANE AND PROCESS FOR PRODUCING THE SAME (75) Inventors: Kohzo Ito, Tokyo (JP); Masatoshi Kidowaki, Tokyo (JP)

(73) Assignee: The University Of Tokyo, Bunkyo-ku, Tokyo (JP)

( * ) Notice: Subject to any disclaimer, the term of this patent is extended or adjusted under 35 U.S.C. 154(b) by 194 days.

(21) Appl. No.: 10/594,970

(22) PCT Filed: Mar. 30, 2005

(86) PCT No.: PCT/JP2005/006062

§ 371 (c)(1), (2), (4) Date: Jun. 27, 2007

(87) PCT Pub. No.: WO2005/095493

PCT Pub. Date: Oct. 13, 2005

(65) Prior Publication Data
US 2008/0097039 A1 Apr. 24, 2008

(30) Foreign Application Priority Data

Mar. 31, 2004 (JP) ............................. 2004-102702

(51) Int. Cl.
*C08G 63/48* (2006.01)
(52) U.S. Cl. .................. 525/54.4; 525/54.44; 525/54.45
(58) Field of Classification Search ................ 525/54.4, 525/54.44, 54.45
See application file for complete search history.

(56) References Cited

U.S. PATENT DOCUMENTS 5,391,592 A    2/1995   Herbrechtmeier et al.
5,538,655 A *  7/1996   Fauteux et al. ............. 252/62.2
6,100,329 A *  8/2000   Gibson et al. .................. 525/55
6,527,887 B1*  3/2003   Ruebner et al. ............. 149/108
6,828,378 B2  12/2004   Okumura et al.
7,151,152 B2* 12/2006   Takata et al. .................. 528/73
7,186,355 B2*  3/2007   Swager ....................... 252/500
2003/0138398 A1* 7/2003  Okumura et al. ......... 424/78.38
2004/0157989 A1  8/2004  Bruhn (Continued)

FOREIGN PATENT DOCUMENTS

EP       1283218 A1    2/2003

(Continued)

OTHER PUBLICATIONS

Ichi, T., et al., "Preparation and Characterization of Three-Dimensional Architecture Based on Polyrotaxane Structure," *Proceedings of the 12th Bioengineering Conference 1999 Annual Meeting of BED/JSME*, Japan Advanced Institute of Science and Technology, Tatsunokuchi, Ishikawa, Jan. 11-12, 2000.

(Continued)

*Primary Examiner*—Bernard Lipman
(74) *Attorney, Agent, or Firm*—Christensen O'Connor Johnson Kindness PLLC (57) ABSTRACT

The present invention provides a material combining properties possessed by crosslinked polymers with stretchability or viscoelasticity, and the producing method thereof. The present invention provides a material comprises a polyrotaxane and a polymer, wherein the polyrotaxane comprises a cyclic molecule, a linear molecule which is included in cavities of the cyclic molecules in a skewered manner, and a capping group which is located at each end of the linear molecule to prevent the dissociation of the cyclic molecules, and the polyrotaxane is bound to a part of or all of the polymer through the cyclic molecule.

28 Claims, 2 Drawing Sheets

U.S. PATENT DOCUMENTS

2004/0162275 A1* 8/2004 Yui et al. ............... 514/183

FOREIGN PATENT DOCUMENTS

| JP | 2003-261637 A | 9/2003 |
|---|---|---|
| JP | 2004-083726 A | 3/2004 |
| JP | 2004-327271 A | 11/2004 |

OTHER PUBLICATIONS

Watanabe, J. et al., "Feasibility Study of Hydrolyzable Polyrotaxane Aiming at Implantable Materials," *Journal of Artificial Organs* 3:136-142, Feb. 18, 2000.

Joung, Y.K., et al., "Anticoagulant Supramolecular-Structured Polymers: Synthesis and Anti Coagulant Activity of Taurine-Conjugated Carboxyethylester-Polyrotaxanes," Science and Technology of Advanced Materials, 6(5):484-490, Jul. 2005.

Notice of Allowance dated May 19, 2009, from U.S. Appl. No. 11/579,842, filed Sep. 9, 2008.

Ooya, T., et al., "Supramolecular Design for Multivalent Interaction: Maltose Mobility Along Polyrotaxane Enhanced Binding With Concanavalin A," Journal of the American Chemical Society 125(43):13016-13017, Oct. 2003.

Park, H.D., et al., "Anticoagulant Activity of Sulfonated Polyrotaxanes as Blood-Compatible Materials," Journal of Biomedical Materials Research, Part A 60(1):186-190, Jan. 2002.

Park, H.D., et al., "In Vitro Biocompatibility Assessment of Sulfonated Polyrotaxane-Immobilized Polyurethane Surfaces," Journal of Biomedical Materials Research, 66A(3):596-604, Jan. 2003.

Supplementary European Search Report dated May 7, 2009, issued in corresponding Application No. EP 05727602, filed Mar. 30, 2005.

Watanabe, J., et al., "Effect of Acetylation of Biodegradable Polyrotaxanes on its Supramolecular Dissociation Via Terminal Ester Hydrolysis," Journal of Biomaterials Science, Polymer Edition, 10(12):1275-1288, 1999.

* cited by examiner

POLYMERIC MATERIAL HAVING POLYROTAXANE AND PROCESS FOR PRODUCING THE SAME

TECHNICAL FIELD

The present invention relates to a material comprising polyrotaxane, and a method for producing the material.

BACKGROUND ART

Conventionally, there are various products containing a crosslinked polymer such as contact lenses, paints and varnishes, and the like. However, in the crosslinked polymer, the distance from a crosslinked point to the next crosslinked point is not uniform; thus, when strain is applied to the crosslinked polymer, a site of a shorter distance between crosslinked points is broken preferentially, causing non-uniform breaking. For example, in the case of a paint or varnish, strain corresponds to force generated by drying after painting, and there is a problem of occurrence of crack on an applied surface after drying. In the case of a contact lens, there is a possibility of application of strain to the lens in use, generating a problem of occurrence of scratch on a lens surface.

On the other hand, Patent Document 1 discloses a crosslinked polyrotaxane, which is formed by crosslinking polyrotaxanes, each of which is comprised of pseudopolyrotaxane, which comprises a linear molecule (axis) and cyclic molecules (rota) in which the linear molecule is included in cavities of cyclic molecules in a skewered manner, and capping groups, each of which locates at each end of the pseudopolyrotaxane (each end of the linear molecule) in order to prevent the dissociation of the cyclic molecules. The crosslinked polyrotaxane has viscoelasticity generated by the movement of a cyclic molecule. Thus, even if strain is applied to the crosslinked polyrotaxane, the strain is dispersed uniformly in the crosslinked polyrotaxane by this action. Therefore, crack or scratch is not generated, differing from the crosslinked polymer. However, in a case where a material is constituted only of crosslinked polyrotaxane, there occurs a problem of relatively high cost. Further, only with the crosslinked polyrotaxane, a property required for a material to be applied is not obtained in some cases.

Patent Document 1: Japanese Patent No. 3475252.

DISCLOSURE OF THE INVENTION

Problem to be Solved by the Invention

An object of the present invention is to solve the problem described above.

Specifically, an object of the present invention is to provide a material having a property of a crosslinked polymer together with a property of crosslinked polyrotaxane, and a method of producing the material. In other words, an object of the present invention is to provide a material having a property of a crosslinked polymer together with stretchability or viscoelasticity, and a method of producing the material.

Means for Solving Problem

From the result of the extensive investigations to achieve the object, the present inventors have found that, by adopting a material comprising polyrotaxane and polymer, in which the polyrotaxane is bound to a part or all of the polymer through a cyclic molecule(s) of the polyrotaxane, the object can be attained. Specifically, the present inventors have found following inventions.

<1> A material comprising a polyrotaxane and polymer, wherein the polyrotaxane comprises a cyclic molecule(s), a linear molecule which is included in cavities of the cyclic molecule(s) in a skewered manner, and a capping group which is located at each end of the linear molecule to prevent the dissociation of the cyclic molecule(s), and wherein a part of the polyrotaxane and the polymer is bound to each other through the cyclic molecule(s).

<2> A material comprising polyrotaxane and polymer, wherein the polyrotaxane comprises a cyclic molecule(s), a linear molecule which is included in cavities of the cyclic molecule(s) in a skewered manner, and a capping group which is located at each end of the linear molecule to prevent the dissociation of the cyclic molecule(s), and wherein the cyclic molecule(s) can move along the linear molecule, at least a part of the polyrotaxane and the polymer is bound to each other through the cyclic molecule(s), and the material is capable of contraction and expansion by the movement of the cyclic molecule(s)

<3> In the above item <1> or <2>, at least a part of the polymers may be physically and/or chemically crosslinked.

<4> In any one of the above items <1> to <3>, a weight ratio of the polyrotaxane to the polymer ((polyrotaxane)/(polymer)) may be 1/1000 or more.

<5> In any one of the above items <1> to <4>, a backbone chain or side chain of the polymer may have at least one selected from the group consisting of a —OH group, a —NH$_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

<6> In any one of the above items <1> to <5>, the linear molecule may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polytetrahydrofuran, polydimethylsiloxane, polyethylene and polypropylene, and preferably polyethylene glycol.

<7> In any one of the above items <1> to <6>, the linear molecule may have a molecular weight of 10,000 or more, preferably 20,000 or more, more preferably 35,000 or more.

<8> In any one of the above items <1> to <7>, the capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<9> In any one of the above items <1> to <8>, the cyclic molecule may have at least one selected from the group consisting of a —OH group, a —$NH_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

<10> In any one of the above items <1> to <9>, the cyclic molecule may be a cyclodextrin molecule which may be substituted.

<11> In any one of the above items <1> to <9>, the cyclic molecule may be a cyclodextrin molecule which may be substituted, and the cyclodextrin molecule may be selected from the group consisting of α-cyclodextrin, β-cyclodextrin and γ-cyclodextrin, and derivatives thereof.

<12> In any one of the above items <1> to <11>, the cyclic molecule may be α-cyclodextrin which may be substituted, and the linear molecule may be polyethylene glycol.

<13> In any one of the above items <1> to <12>, the linear molecule may have the cyclic molecule included in a skewered manner at an amount of 0.001 to 0.6, preferably 0.01 to 0.5, more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

<14> In any one of the above items <1> to <13>, the polymer and the cyclic molecule in the polyrotaxane may be chemically bound to each other by a crosslinking agent.

<15> In the above item <14>, the crosslinking agent may have a molecular weight of less than 2,000, preferably less than 1,000, more preferably less than 600, most preferably less than 400.

<16> In the above item <14> or <15>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<17> In any one of the above items <1> to <16>, the material may be selected from the group consisting of optical materials, contact lenses, biomaterials, medical materials, tire materials, application agents and adhesives.

<18> A method for preparing a material which comprises polyrotaxane and polymer comprising the steps of:
  a) mixing the polymer and the polyrotaxane which comprises a cyclic molecule(s), a linear molecule which is included in cavities of the cyclic molecule(s) in a skewered manner, and a capping group which is located at each end of the linear molecule to prevent the dissociation of the cyclic molecule(s);
  b) physically and/or chemically crosslinking at least a part of the polymer; and
  c) binding the at least a part of the polymer and the polyrotaxane through the cyclic molecule(s).

<19> In the above item <18>, the cyclic molecule can move along the linear molecule, and the at least a part of the polyrotaxane and the polymer may be bound to each other through the cyclic molecule, and the material may be capable of contraction and expansion by the movement of the cyclic molecule.

<20> In the above item <18> or <19>, the at least part of the polymer may be chemically crosslinked in the step b).

<21> In any one of the above items <18> to <20>, the step c) may be carried out after the step b).

<22> In any one of the above items <18> to <20>, the step c) may be carried out prior to the step b).

<23> In any one of the above items <18> to <20>, the steps b) and c) may be carried out at the substantially same time.

<24> In any one of the above items <18> to <23>, a weight ratio of the polyrotaxane to the polymer ((polyrotaxane)/(polymer)) may be 1/1000 or more.

<25> In any one of the above items <18> to <24>, a backbone chain or side chain of the polymer may have at least one selected from the group consisting of a —OH group, a —$NH_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

<26> In any one of the above items <18> to <25>, the linear molecule may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polytetrahydrofuran, polydimethylsiloxane, polyethylene and polypropylene, and preferably polyethylene glycol.

<27> In any one of the above items <18> to <26>, the linear molecule may have a molecular weight of 10,000 or more, preferably 20,000 or more, more preferably 35,000 or more.

<28> In any one of the above items <18> to <27>, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<29> In any one of the above items <18> to <28>, the cyclic molecule may have at least one selected from the group consisting of a —OH group, a —NH$_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

<30> In any one of the above items <18> to <29>, the cyclic molecule may be a cyclodextrin molecule which may be substituted.

<31> In any one of the above items <18> to <29>, the cyclic molecule may be a cyclodextrin molecule which may be substituted, and the cyclodextrin molecule may be selected from the group consisting of α-cyclodextrin, β-cyclodextrin and γ-cyclodextrin, and derivatives thereof.

<32> In any one of the above items <18> to <31>, the cyclic molecule may be α-cyclodextrin which may be substituted, and the linear molecule may be polyethylene glycol.

<33> In any one of the above items <18> to <32>, the linear molecule may have the cyclic molecule(s) included in a skewered manner at an amount of 0.001 to 0.6, preferably 0.01 to 0.5, more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

<34> In any one of the above items <18> to <33>, the polymer and the cyclic molecule in the polyrotaxane may be chemically bound to each other by a crosslinking agent.

<35> In the above item <34>, the crosslinking agent may have a molecular weight of less than 2,000, preferably less than 1,000, more preferably less than 600, most preferably less than 400.

<36> In the above item <34> or <35>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<37> In any one of the above items <18> to <36>, the material may be selected from the group consisting of optical materials, contact lenses, biomaterials, medical materials, tire materials, application agents and adhesives.

<38> A method for preparing a material which comprises polyrotaxane and polymer comprising the steps of:
  a) mixing a monomer constructing the polymer and the polyrotaxane which comprises a cyclic molecule(s), a linear molecule which is included in cavities of the cyclic molecule(s) in a skewered manner, and a capping group which is located at each end of the linear molecule to prevent the dissociation of the cyclic molecule(s);
  b) polymerizing the monomer to form the polymer;
  c) physically and/or chemically crosslinking at least a part of the polymer; and
  d) binding the at least a part of the polymer and the polyrotaxane through the cyclic molecule(s).

<39> In the above item <38>, the cyclic molecule can move along the linear molecule, and the at least a part of the polyrotaxane and the polymer may be bound to each other through the cyclic molecule, and the material may be capable of contraction and expansion by the movement of the cyclic molecule.

<40> In the above item <38> or <39>, at least a part of the polymer may be chemically crosslinked in the step c).

<41> In any one of the above items <38> to <40>, the steps b) and c) may be carried out at the substantially same time.

<42> In any one of the above items <38> to <41>, the steps c) and d) may be carried out at the substantially same time.

<43> In any one of the above items <38> to <41>, the steps b), c) and d) may be carried out at the substantially same time.

<44> In any one of the above items <38> to <40>, the step d) may be carried out prior to the step c).

<45> In any one of the above items <38> to <40>, the step d) may be carried out after the step c).

<46> In any one of the above items <38> to <45>, a weight ratio of the polyrotaxane to the polymer ((polyrotaxane)/(polymer)) may be 1/1000 or more.

<47> In any one of the above items <38> to <46>, a backbone chain or side chain of the polymer may have at least one selected from the group consisting of a —OH group, a —NH$_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

<48> In any one of the above items <38> to <47>, the linear molecule may be selected from the group consisting of polyvinyl alcohol, polyvinylpyrrolidone, poly(meth)acrylic acid, cellulose-based resins. (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polytetrahydrofuran, polydimethylsiloxane, polyethylene and polypropylene, and preferably polyethylene glycol.

<49> In any one of the above items <38> to <48>, the linear molecule may have a molecular weight of 10,000 or more, preferably 20,000 or more, more preferably 35,000 or more.

<50> In any one of the above items <38> to <49>, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<51> In any one of the above items <38> to <50>, the cyclic molecule may have at least one selected from the group consisting of a —OH group, a —NH$_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

<52> In any one of the above items <38> to <51>, the cyclic molecule may be a cyclodextrin molecule which may be substituted.

<53> In any one of the above items <38> to <51>, the cyclic molecule may be a cyclodextrin molecule which may be substituted, and the cyclodextrin molecule may be selected from the group consisting of α-cyclodextrin, β-cyclodextrin and γ-cyclodextrin, and derivatives thereof.

<54> In any one of the above items <38> to <53>, the cyclic molecule may be α-cyclodextrin which may be substituted, and the linear molecule may be polyethylene glycol.

<55> In any one of the above items <38> to <54>, the linear molecule may have the cyclic molecule(s) included in a skewered manner at an amount of 0.001 to 0.6, preferably 0.01 to 0.5, more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

<56> In any one of the above items <38> to <55>, the polymer and the cyclic molecule in the polyrotaxane may be chemically bound to each other by a crosslinking agent.

<57> In the above item <56>, the crosslinking agent may have a molecular weight of less than 2,000, preferably less than 1,000, more preferably less than 600, most preferably less than 400.

<58> In the above item <56> or <57>, the crosslinking agent may be selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

<59> In any one of the above items <38> to <58>, the material may be selected from the group consisting of optical materials, contact lenses, biomaterials, medical materials, tire materials, application agents and adhesives.

Effects of the Invention

The present invention can provide a material having a property of a crosslinked polymer together with a property of crosslinked polyrotaxane, and a method of producing the material. In other words, the present invention can provide a material having a property of a crosslinked polymer together with stretchability or viscoelasticity, and a method of producing the material.

PREFERRED EMBODIMENTS FOR CARRYING OUT THE PRESENT INVENTION

The present invention will be described in detail hereinafter.

The present invention provides a material comprising polyrotaxane and polymer. In the material, polyrotaxane comprises a cyclic molecule, a linear molecule which is included in cavities of the cyclic molecules in a skewered manner, and a capping group which is located at each end of the linear molecule to prevent the dissociation of the cyclic molecules. Further, the material of the present invention is characterized in that at least a part of the polyrotaxane and the polymer is bound to each other through the cyclic molecule.

The material of the present invention having the constitution provides an action described below: The cyclic molecule can move along the linear molecule. Thus, when force (tension and/or stress) is loaded on the material, the material is capable of expansion and contraction by the movement of the cyclic molecule.

Figure 1:
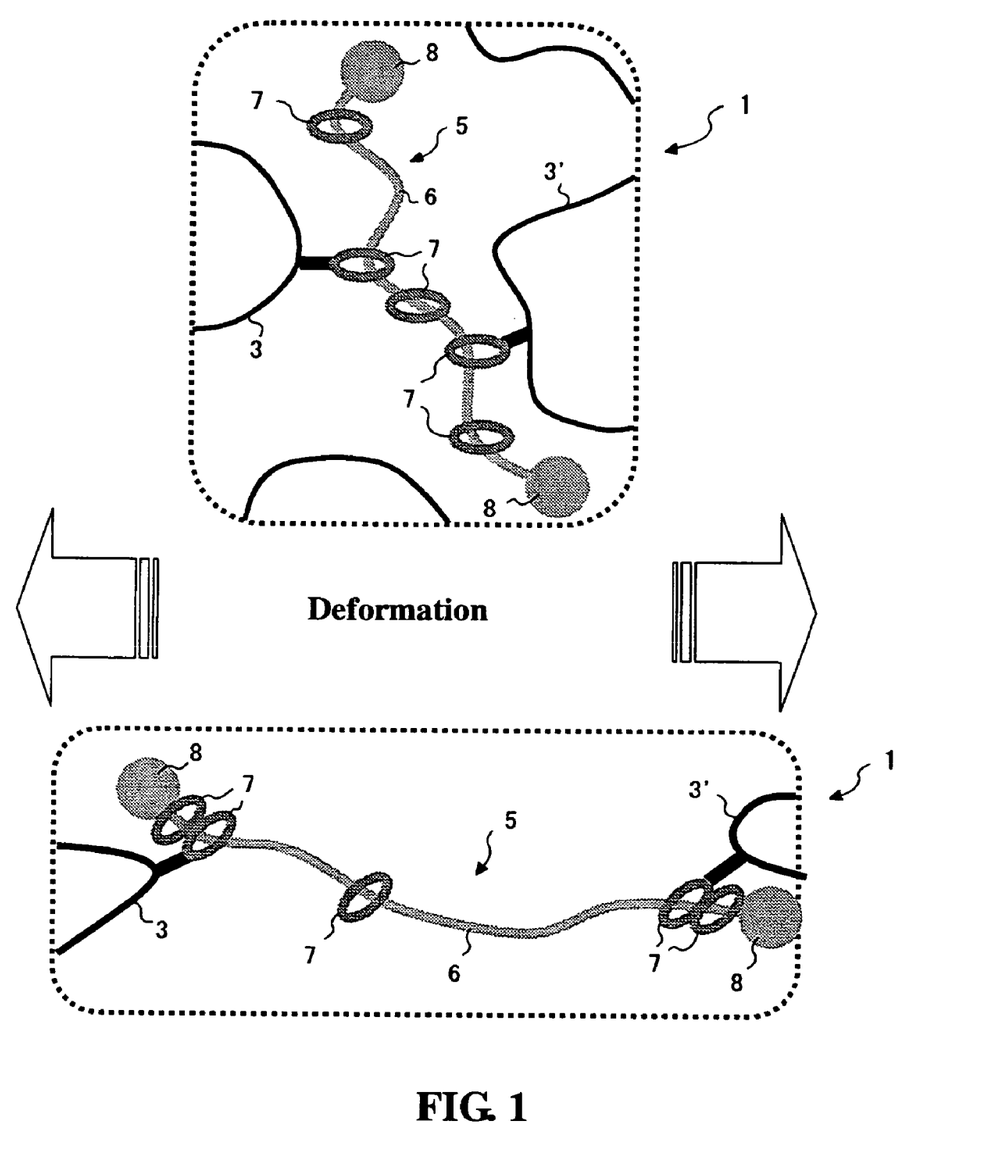
FIG. 1 shows a scheme of a material according to the present invention.

The material according to the present invention will be illustrated using FIG. 1. FIG. 1 shows a schematic view of a material 1 of the present invention. The material 1 of the present invention comprises a polymer 3 and polyrotaxane 5. The polyrotaxane 5 has a linear molecule 6, a cyclic molecule 7 and a capping group 8. The polymer 3 and polymer 3' and the polyrotaxane 5 are bound through the cyclic molecule 7. When stress of deformation along an arrow direction is loaded on the material 1 as shown in FIG. 1(a), the material 1 can adopt a configuration as shown in FIG. 1(b). That is, since the cyclic molecule 7 can move along the linear molecule 6 (in other words, the linear molecule can move in the cyclic molecule), stress of deformation can be absorbed in the material. On the other hand, in the case of a conventional material having no polyrotaxane, although not shown in a drawing, when stress of deformation is loaded, the stress cannot be absorbed in the material, leading to cut of a bond between polymers.

In the material of the present invention, the polyrotaxane and the polymer are bound or crosslinked. Polymers may be mutually crosslinked or, polyrotaxanes may be mutually crosslinked. More specifically, the present invention can provide i) a material in which the polyrotaxane and the polymer are bound or crosslinked, and polymers are crosslinked and polyrotaxanes are crosslinked; ii) a material in which the polyrotaxane and the polymer are bound or crosslinked, and the polyrotaxanes are crosslinked, while polymers are not crosslinked; iii) a material in which the polyrotaxane and the polymer are bound or crosslinked, and the polymers are crosslinked, while the polyrotaxanes are not crosslinked; and iv) a material in which the polyrotaxane and the polymer are bound or crosslinked, while polymers are not crosslinked and polyrotaxanes are not crosslinked. In any case of i) to iv), a polymer forms a crosslinked polymer through binding or crosslinking with polyrotaxane, or through mutual crosslinking of polymers.

The presence of polyrotaxane in a material according to the present invention can provide expansion and contraction of the material as described above. Accordingly, polyrotaxane may be present in the material according to the present invention. The amount of polyrotaxane in a material depends on a nature required for the material. For example, the weight ratio of the polyrotaxane to the polymer ((polyrotaxane)/(polymer)) may be 1/1000 or more, namely, polyrotaxane is present in a proportion of 1 or more based on 1000 of a polymer.

At least a part of the polymers in a material according to the present invention may be physically and/or chemically crosslinked.

The polymer in a material according to the present invention may have on a backbone chain or side chain at least one selected from the group consisting of a —OH group, a —NH$_2$ group, a —COOH group, an epoxy group, a vinyl group, a thiol group and a photo-crosslinkable group. The photo-crosslinkable group may include, but are not limited to, cinnamic acid, coumarin, chalcone, anthracene, styrylpyridine, styrylpyridinium salt, styrylquinolium salt and the like.

The polymer in the present invention may be a homopolymer or copolymer. Two or more polymers may be present. In a case where two or more polymers are present, at least one polymer may be bound to polyrotaxane through a cyclic molecule. In a case where the polymer of a material according to the present invention is a copolymer, it may be composed of two, or three or more monomers. In the case of a copolymer, the copolymer may be one of a block copolymer, alternating copolymer, random copolymer, graft copolymer and the like.

Examples of the polymer may include, but not limited to, polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. The derivatives may contain the above-described group, i.e., at least one selected from the group consisting of a —OH group, a —NH$_2$ group, a —COOH group, an epoxy group, a vinyl group, a thiol group and a photo-crosslinkable group.

The linear molecule of polyrotaxane in a material according to the present invention may include polyvinyl alcohol, polyvinylpyrrolidone, poly(meth) acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polypropylene glycol, polytetrahydrofuran, polydimethylsiloxane, polyethylene and polypropylene, and preferably polyethylene glycol.

A molecular weight of the linear molecule according to the present invention may be 10,000 or more, preferably 20,000 or more, more preferably 35,000 or more.

The capping group of the polyrotaxane in the material according to the present invention is not limited, as long as the group has an action of preventing dissociation of a cyclic molecule from a linear molecule. The capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural.); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

The cyclic molecule in the polyrotaxane according to the present invention may comprise at least one selected from the group consisting of a —OH group, a —NH$_2$ group, a —COOH group, an epoxy group, a vinyl group, a thiol group, and a photo-crosslinkable group. Examples of the photo-crosslinkable group may include, but are not limited to, cinnamic acid, coumarin, chalcone, anthracene, styrylpyridine, styrylpyridinium salt, styrylquinolium salt and the like.

The cyclic molecule may be a cyclodextrin molecule which may be substituted. The cyclodextrin may be selected from the group consisting of α-cyclodextrin, β-cyclodextrin and γ-cyclodextrin, and derivatives thereof.

At least a part of a cyclic molecule in a polyrotaxane is bound to at least a part of a polymer as described above. In this case, a group carried on the cyclic molecule, for example, a —OH group, —NH$_2$ group, —COOH group, epoxy group, vinyl group, thiol group, photo-crosslinkable group or the like may be bound to a group carried on the backbone chain and/or side chain of the polymer, for example, a —OH group, —NH$_2$ group, —COOH group, epoxy group, vinyl group, thiol group, photo-crosslinkable group or the like, via a chemical reaction.

In the material according to the present invention, the cyclic molecule may be a cyclodextrin molecule, and the linear molecule may be polyethylene glycol.

In the material according to the present invention, the linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

When the inclusion amount of a cyclic molecule is near the maximum value, there occurs a tendency that the moving distance of a cyclic molecule along a linear molecule is limited. When the moving distance is limited, a tendency of limitation of the degree of expansion and contraction of a material occurs undesirably.

The maximum inclusion amount of a cyclic molecule can be determined depending on the length of a linear molecule and the thickness of a cyclic molecule. For example, when the linear molecule is polyethylene glycol and the cyclic molecule is an α-cyclodextrin molecule, the maximum inclusion amount is measured empirically (see, Macromolecules 1993, 26, 5698-5703, whole contents of which is incorporated herein).

In the material according to the present invention, the polyrotaxane and the polymer may be chemically bound to each other by a crosslinking agent. The crosslinking agent may have a molecular weight of less than 2,000, preferably less than 1,000, more preferably less than 600, and most preferably less than 400.

The crosslinking agent may be selected from the group consisting of cyanuric chloride, trimesoyl chloride, terephthaloyl chloride, epichlorohydrin, dibromobenzene, glutaraldehyde, phenylene diisocyanate, tolylene diisocyanate, divinyl sulfone, 1,1'-carbonyldiimidazole and alkoxysilanes.

The material of the present invention can provide stretchability owing to the presence of polyrotaxane. As described above, stretchability depends on the amount of polyrotaxane, the inclusion amount described above, and the like, and it is preferable to control these amounts depending on a property required for the material.

The material according to the present invention can be applied to a polymer material required to have stretchability. Examples of the polymer material may include, but are not limited to, optical materials, contact lenses, biomaterials, medical materials, tire materials, application agents, adhesives and the like; and environment-related materials, living wares, civil engineering and construction materials, battery-related materials, foods, health materials, sports equipment and materials thereof, cloth and fashion materials, fibers, toy and entertainment materials, art-related materials, automobile-related materials, and the like.

Examples of the material may include, but are not limited to, the following materials.

That is, examples of the application range of the material according to the present invention may include rubber band, packing material, agar medium, clothing fabric, shoe sole of sport shoes and the like, cushioning material or impulse absorbing material of helmet, protector and the like, bumper of automobile and various apparatuses, toy, coating material for friction part of apparatus (for example, coating material for sliding part or housing of pump), adhesive, sealing material for tight seal, dehumidification agent or dew removing material, filler for bed mat analogous to water bed, material for special effect photograph or material for miniature model, optical material such as material for soft contact lens (particularly, material for soft contact lens having high moisture content and/or excellent strength), material for tire, gel for electrophoresis, novel foodstuff pursuant to gum and the like, gum for dog, biomaterials including biocompatible materials such as artificial cornea, artificial crystalline lens, artificial vitreous body, artificial skin, artificial muscle, artificial joint, artificial cartilage and the like and material for breast enlargement and the like, medical materials used for outside of the body such as wet dressing material, wound covering material and the like, drug delivery system, earplug, wet suit, protective mat mounted on wall in outfield in baseball ground, armrest for personal computer, disposable sanitary products such as child diaper, sanitary napkin, adult incontinence products and the like, photosensitive material for photograph, aromatic substance, application agents such as coating materials including various paints and the coating material, separation functional membrane, water-swelling rubber, water-proof tape, soil, material for pile drawing out material, material for removing moisture in oil, humidity conditioning material, moisture absorbing gelling agent, dehumidifier, artificial snow material in indoor artificial ski area, fire-proof coating material for building, sand and rock avalanche preventing material, concrete products such as concrete laying material and the like, waste mud gelling agent, lost circulation preventing agent, greening materials such as soil water-retentive agent or seedling raising medium and the like, material for chromatography carrier, material for bioreactor carrier, various element materials of fuel battery, for example, various battery materials such as electrolyte and the like.

The materials can be produced, for example, by methods described below:

One embodiment of the method of producing the material according to the present invention comprises a) a step of mixing polyrotaxane comprising a cyclic molecule, a linear molecule which is included in cavities of the cyclic molecule in a skewered manner, and a capping group which is located at each end of the linear molecule to prevent the dissociation of the cyclic molecule, with a polymer; b) a step of physically and/or chemically crosslinking at least a part of the polymer, and c) a step of binding the at least a part of the polymer and polyrotaxane through the cyclic molecule.

In the step b), the at least a part of the polymer may be chemically crosslinked. The chemical crosslinking can be carried out, for example, using a crosslinking agent. The crosslinking agent may include, but not limited to, the above-mentioned agents.

The step c) may be carried out before or after the step b). The step b) and the step c) may be carried out at the substantially same time.

The mixing step a) may be carried out without solvent or in a solvent, depending on the polymer to be used. In the case of using a solvent, examples of the solvent may include, but are not limited to, water, toluene, xylene, benzene, anisol, cyclohexanone, N-methylpyrrolidone, dimethylformamide, dimethylacetamide, methyl ethyl ketone, chloroform, dichloromethane, carbon tetrachloride, hexafluoroisopropyl alcohol, tetrahydrofuran, dioxane, acetone, ethyl acetate, dimethyl sulfoxide, acetonitrile and the like.

The crosslinking step b) may be carried out under polymer crosslinking conditions conventionally known. Examples thereof may include, but not limited to, the following conditions. For example, i) when the polymer has an active substituent such as an epoxy group, a cross linking reaction can be generated by heating or in the presence of active hydrogen such as in amine or acid anhydride. Further, a crosslinking reaction can be generated also by irradiation with light in the presence of a photo-acid generator or photo-base generator. ii) When the polymer has an unsaturated double bond such as a vinyl group, a crosslinking reaction can be generated by heating or irradiation with light in the presence of heat or photo-radical generator. iii) When the polymer has the photo-crosslinkable group, a crosslinking reaction can be generated by heating or irradiation with light. iv) When the polymer has a hydroxyl group, amino group, carboxyl group and the like, a crosslinking reaction can be generated in the presence of poly-substituted isocyanates, carbodiimides, triazines or silanes. v) Even when the polymer has no such groups, a crosslinking reaction can also be generated by irradiation with electron beam.

The binding step c) may be carried out by a chemical reaction of a group carried on the polymer on its main chain and/or side chain, for example, a —OH group, —NH$_2$ group, —COOH group, epoxy group, vinyl group, thiol group, photo-crosslinkable group or the like with a group carried on the cyclic molecule, for example, a —OH group, —NH$_2$ group, —COOH group, epoxy group, vinyl group, thiol group, photo-crosslinkable group or the like. The conditions for the binding step c) depend on the group carried on the polymer, the group carried on the cyclic molecule, and the like. The conditions for the binding step may use, but not limited to, for example, the above-described crosslinking conditions.

The material according to the present invention can also be produced by the following production methods.

One embodiment of the method of producing the material according to the present invention comprises a) a step of mixing polyrotaxane comprising a cyclic molecule, a linear molecule which is included in cavities of the cyclic molecules in a skewered manner, and a capping group which is located at each end of the linear molecule to prevent the dissociation of the cyclic molecule, with a monomer constituting a polymer; b) a step of polymerizing the monomer to form a polymer, c) a step of physically and/or chemically crosslinking at least a part of the polymer, and d) a step of binding at least a part of the polymer and the polyrotaxane through the cyclic molecule.

In the step c) in the method, at least a part of the polymer may be chemically crosslinked. The chemical crosslinking can be carried out, for example, using a crosslinking agent. The crosslinking agent may include, but not limited to, the above-mentioned agents.

In the method, the steps b) and c) may be carried out at the substantially same time. The steps c) and d) may be carried out at the substantially same time. Further, the steps b), c) and d) may also be carried out at the substantially same time.

In contrast, the step d) may also be carried out before or after the step c).

The conditions for the step of polymerizing a monomer to form a polymer depend on the monomer to be used, and the like. As these conditions, conventionally known conditions can be used.

As the polyrotaxane, polymer, cyclic molecule, linear molecule, capping group and the like to be used in the production method of the present invention, the same compounds as described above can be used. The monomer constituting a polymer depends on the polymer, but is not particularly limited, as long as it can form the polymer.

The present invention will be illustrated more specifically by way of the following Examples, but is not limited thereby.

EXAMPLE 1

<Preparation of Polyrotaxane>

<<Preparation of PEG-carboxylic Acid Via TEMPO Oxidation of PEG>>

10 g of PEG (molecular weight: 35,000), 100 mg of TEMPO (2,2,6,6-tetramethyl-1-piperidinyloxy radical) and 1 g of sodium bromide were dissolved in 100 ml of water. To the mixture was added 5 ml of a commercially available aqueous solution of sodium hypochlorite (effective chlorine concentration: approx. 5%), and reacted with stirring at room temperature. Immediately after adding sodium hypochlorite, pH of the reaction mixture was rapidly decreased with the progress of the reaction, and was adjusted by adding 1N NaOH so that pH of the reaction mixture was preferably kept at 10 to 11. Decrease of pH became scarcely observable within almost 3 minutes, and then the reaction mixture was stirred for 10 minutes. The reaction was quenched by adding ethanol with an amount of up to 5 ml. Ingredients other than inorganic salts were extracted with 50 ml of methylene chloride three times, and methylene chloride was removed with an evaporator. The residue was dissolved in 250 ml of hot ethanol, and allowed to stand in a freezer at −4° C. overnight to precipitate a PEG-carboxylic acid, in which each end of the PEG was substituted with carboxylic acid (—COOH). The precipitated PEG-carboxylic acid was collected by centrifugation. The collected PEG-carboxylic acid was subjected to the procedure consisting of dissolving in hot ethanol, precipitating and centrifuging, for several times, and finally dried in vacuum, to give a purified PEG-carboxylic acid. Yield was 95% or more. A degree of carboxylation was 95% or more.

<<Preparation of Inclusion Complex Using PEG-carboxylic Acid and α-CD>>

Each of 3 g of the PEG-carboxylic acid prepared above and 7.5 g of α-CD was dissolved in 50 ml of hot water at 70° C. These solutions were mixed, and allowed to stand in a refrigerator (4° C.) overnight. The precipitated inclusion complex in a pasty state was freeze-dried and collected.

<<Capping of Inclusion Complex Using Reaction Reagents of Adamantane Amine and a BOP Reagent>>

To the resulting inclusion complex, a solution of 0.13 g of adamantane amine, 0.38 g of BOP reagent (benzotriazol-1-yl-oxy-tris(dimethylamino)phosphonium hexafluorophosphate), 0.14 ml of diisopropylethylamine in 50 ml of dehydrated dimethylformamide (DMF) was added, shaken well, and then allowed to stand in a refrigerator overnight. Then, to the mixture was added 50 ml of methanol. The mixture was stirred and centrifuged. Then, the supernatant was discarded. Further, to the resulting mixture 100 ml of mixture of DMF/methanol=1:1, and the washing with the DMF/methanol mixture was repeated twice, followed by washing with 100 ml of methanol and centrifuging twice. The resultant precipitate was dried in vacuum, dissolved in 50 ml of dimethylsulfoxide (DMSO), dropped into 700 ml of water, and thereby a polyrotaxane was precipitated. The precipitated polyrotaxane was collected by centrifugation. The collected polyrotaxane was treated with the similar re-precipitation step, to obtain 9 g of a purified polyrotaxane. NMR measurement of the resulting polyrotaxane showed that a molar ratio of CD to PEG monomer was 11:100 (degree of inclusion: 22%).

<<Oxymethylation of α-CD>>

5.0 g of the polyrotaxane as prepared above was dissolved in 100 ml of dehydrated DMSO. To the mixture was added 3.8 g of a 28% solution of sodium methoxide in methanol (corresponding to 5.4 equivalents relative to 18 equivalents of hydroxyl groups of an α-CD molecule in the polyrotaxane), followed by removing methanol in reduced vacuum. To the mixture was added 2.8 g of methyl iodide, stirred for 24 hours, and then diluted with purified water to 150 ml of volume. The diluted mixture was dialyzed for 48 hours with a dialysis tube (fraction molecular weight: 12,000) in flowing tap water. The mixture was further dialyzed for 12 hours in 1000 ml of purified water four times, and then freeze-dried to give a methylated polyrotaxane in which a part of OH groups of an α-CD molecule is substituted with an $OCH_3$ group (degree of methylation: 30%). Yield: 4.6 g. $^1$H-NMR ($CDCl_3$-$d_6$, 300 MHz) δ (ppm) 3.0-4.2 (m, 18.4H), 4.8-5.2 (m, 3.8H), 5.3-6.0 (m, 1H).

<Preparation of the Material According to the Present Invention>

Polyvinyl alcohol (hereinafter may be abbreviated as "PVA", degree of polymerization: 2,000) was dissolved in a 0.03N NaOH aqueous solution, to prepare a 1.0 ml of a 5 wt % solution. To the solution 10 mg of the methylated polyrotaxane ($Mw_{PEG}$: 35,000; degree of methylation: 30%; degree of inclusion: 22%) was added and dissolved. To the mixed solution 10 μL of divinyl sulfone (hereinafter may be abbreviated as "DVS") was added, and then allowed to stand at temperature of 25° C. for 20 hours, to obtain a gelated body A-1 of a mixture of PVA and the methylated polyrotaxane (Weight ratio of PVA to the methylated polyrotaxane=5:1).

COMPARATIVE EXAMPLE 1

PVA (degree of polymerization: 2,000) was dissolved in a 0.03N NaOH aqueous solution, to prepare 1.0 ml of a 5 wt % solution, and cooled at 5° C. To the solution 10 μL of DVS was added, and then allowed to stand at temperature of 25° C. for 20 hours, to obtain a gelated body A-2 of PVA.

Figure 2:
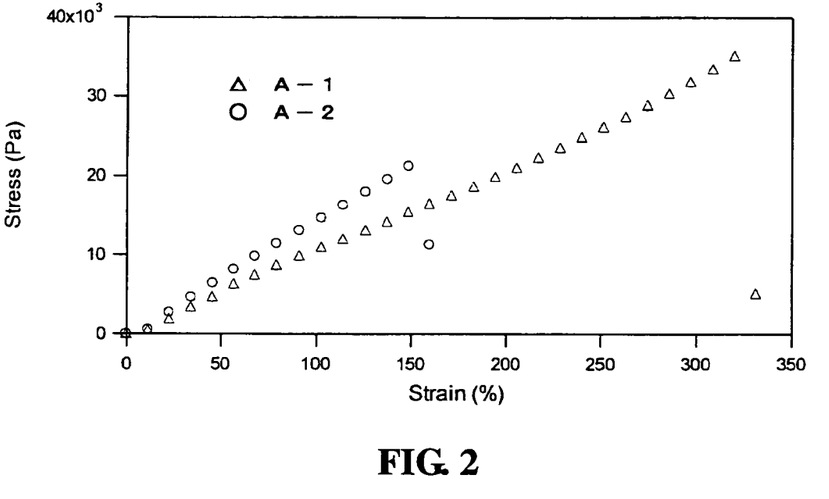
FIG. 2 shows viscoelastic curves of Example 1 (gelated body A-1) and Comparative Example 1 (gelated body A-2).

Viscoelastic curves of the gelated bodies A-1 and A-2 were measured, to obtain results shown in Table 1 and FIG. 2. Table 1 and FIG. 2 show that the gelated body A-1 as the material according to the present invention was improved in extension ratio, owing to the presence of methylated polyrotaxane.

TABLE 1

| Gelated body | Viscoelastic characteristics of gelated bodies A-1 and A-2 | | |
|---|---|---|---|
| | Extension ratio (%) | Maximum stress (kPa) | Stiffness (kPa) |
| A-1 | 320 | 35 | 12 |
| A-2 | 149 | 25 | 20 |

EXAMPLE 2

A methylated polyrotaxane was prepared in a manner similar to Example 1, except that a molecular weight of PEG was 500,000, molar ratio CD:PEG monomer=29:200 (degree of inclusion: 29%) and a degree of methylation was 30%.

<Preparation of the Material According to the Present Invention>

PVA (degree of polymerization: 2,000) was dissolved in a 0.03N NaOH aqueous solution, to prepare 1.0 ml of a 5 wt % PVA solution. Alternatively, the methylated polyrotaxane ($Mw_{PEG}$: 500,000; degree of methylation: 30%; degree of inclusion: 29%) was dissolved in a 0.03N NaOH aqueous solution, to prepare a 5 wt % methylated polyrotaxane solution. To 1.0 ml of the PVA solution was added 3 mg of the methylated polyrotaxane solution, and dissolved. To the resulting mixture was added 10 μL of DVS, and then allowed to stand at temperature of 5° C. for 20 hours, to obtain a gelated body A-3 of a mixture of PVA and the methylated polyrotaxane (Weight ratio of PVA to the methylated polyrotaxane=1000:3).

COMPARATIVE EXAMPLE 2

PVA (degree of polymerization: 2,000) was dissolved in a 0.03N NaOH aqueous solution, to prepare 1.0 ml of a 5 wt % solution, and cooled at 5° C. To the solution was added 10 μL of DVS, and then allowed to stand at temperature of 5° C. for 20 hours, to obtain a gelated body A-4 of PVA.

Figure 3:
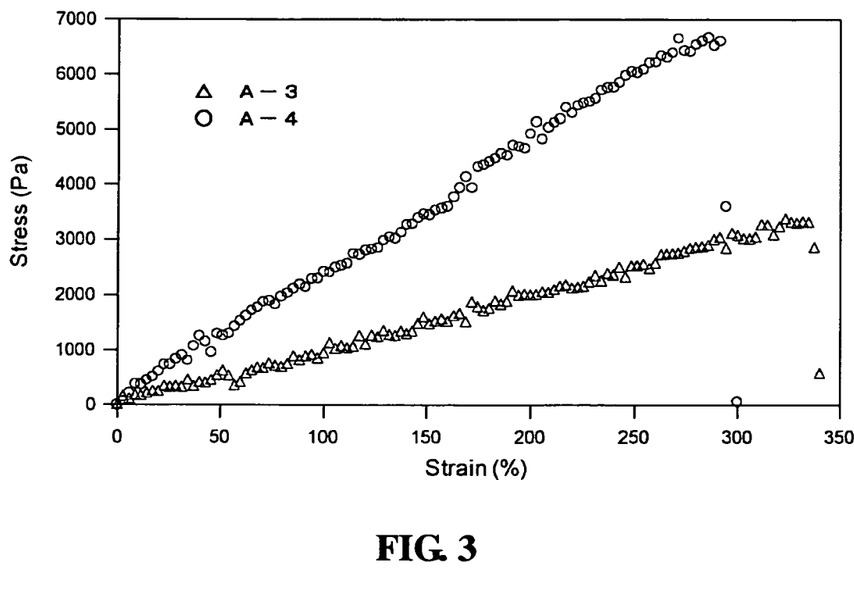
FIG. 3 shows viscoelastic curves of Example 2 (gelated body A-3) and Comparative Example 2 (gelated body A-4).

Viscoelastic curves of the gelated bodies A-3 and A-4 were measured, to obtain results shown in Table 2 and FIG. 3. Table 2 and FIG. 3 show that the gelated body A-3 as the material according to the present invention was improved in extension ratio, owing to the presence of methylated polyrotaxane.

TABLE 2

| Gelated body | Viscoelastic characteristics of gelated bodies A-3 and A-4 | | |
|---|---|---|---|
| | Extension ratio (%) | Maximum stress (kPa) | Stiffness (kPa) |
| A-3 | 334 | 3.3 | 0.8 |
| A-4 | 291 | 6.6 | 2.3 |

EXAMPLE 3

A polyrotaxane was prepared in a manner similar to Example 1.

<Hydroxypropylation of α-CD>

5.0 g of the polyrotaxane as prepared above was dissolved in 50 ml of a 1N NaOH aqueous solution, and to the resulting mixture was added 10 g of propylene oxide. The mixture was stirred for 24 hours at room temperature, and then neutralized with hydrochloric acid. The resulting solution was dialyzed for 48 hours with a dialysis tube (fraction molecular weight: 12,000) in flowing tap water. The mixture was further dialyzed for 12 hours in 2000 ml of purified water four times, and then freeze-dried to give a hydroxypropylated polyrotaxane (degree of hydroxypropylation: 33% to the OH groups). Yield: 5.0 g. $^1$H-NMR (DMSO-$d_6$, 400 MHz) δ (ppm) 1.0 (s, 3.0H), 3.1-4.0 (m, 14.0H), 4.3-5.1 (m, 3.1H), 5.3-6.0 (m, 1.0H).

<Preparation of the Material According to the Present Invention>

PVA (degree of polymerization: 500) was dissolved in a 0.03N NaOH aqueous solution, to prepare 1.0 ml of a 5 wt % PVA solution. To the solution was added 10 mg of the hydroxypropylated polyrotaxane ($Mw_{PEG}$: 35,000; degree of hydroxypropylation: 30%; degree of inclusion: 22%), and dissolved. To the mixture was added 10 μL of DVS, and then allowed to stand at temperature of 25° C. for 20 hours, to obtain a gelated body of a mixture of PVA and the hydroxypropylated polyrotaxane (Weight ratio of PVA to the hydroxypropylated polyrotaxane =5:1).

EXAMPLE 4

A hydroxypropylated polyrotaxane was prepared in a manner similar to Example 3, except that a molecular weight of PEG was 500,000, molar ratio CD:PEG monomer=29:200 (degree of inclusion: 29%) and a degree of hydroxypropylation was 35%.

<Preparation of the Material According to the Present Invention>

PVA (degree of polymerization: 500) was dissolved in a 1N NaOH aqueous solution, to prepare 1.0 ml of a 5 wt % PVA solution. Alternatively, the hydroxypropylated polyrotaxane ($Mw_{PEG}$: 500,000; degree of hydroxypropylation: 35%; degree of inclusion: 29%) was dissolved in a 1N NaOH aqueous solution, to prepare a 5 wt % hydroxypropylated polyrotaxane solution. To 1.0 ml of the PVA solution was added 3 mg of the hydroxypropylated polyrotaxane solution, and dissolved. To the resulting mixture was added 20 μL of 1,4-butanediol glycidyl ether, and then allowed to stand at temperature of 50° C. for 20 hours, to obtain a gelated body of a mixture of PVA and the hydroxypropylated polyrotaxane (Weight ratio of PVA to the hydroxypropylated polyrotaxane=1000:3).

EXAMPLE 5

<Preparation of the Material According to the Present Invention>

Polyacrylic acid (hereinafter may be abbreviated as "PAA", average molecular weight: 25,000) was dissolved in a 1N NaOH aqueous solution, to prepare 1.0 ml of a 15 wt % PAA solution. Alternatively, a polyrotaxane prepared in a manner similar to Example 1 ($Mw_{PEG}$: 35,000; degree of inclusion: 29%) was dissolved in a 1N NaOH aqueous solution, to prepare a 15 wt % polyrotaxane solution. To 1.0 ml of the PAA solution was added 50 μL of the polyrotaxane solution, and mixed. To the resulting mixture was added 20 μL of 1,4-butanediol glycidyl ether, and then allowed to stand at temperature of 50° C. for 20 hours, to obtain a gelated body of a mixture of PAA and the polyrotaxane (Weight ratio of PAA to the polyrotaxane=20:1).

EXAMPLE 6

<Preparation of the Material According to the Present Invention>

PAA (average molecular weight: 25,000) was dissolved in a 1N NaOH aqueous solution, to prepare 1.0 ml of a 15 wt % PAA solution. Alternatively, a methylated polyrotaxane prepared in a manner similar to Example 1 ($Mw_{PEG}$: 35,000; degree of methylation: 30%; degree of inclusion: 29%) was dissolved in a 1N NaOH aqueous solution, to prepare a 15 wt % methylated polyrotaxane solution. To 1.0 ml of the PAA solution was added 20 μL of the methylated polyrotaxane solution, and mixed. To the resulting mixture was added 20 μL of 1,4-butanediol glycidyl ether, and then allowed to stand at temperature of 50° C. for 20 hours, to obtain a gelated body of a mixture of PAA and the methylated polyrotaxane (Weight ratio of PAA to the methylated polyrotaxane=50:1).

EXAMPLE 7

<Preparation of the Material According to the Present Invention>

PAA (average molecular weight: 25,000) was dissolved in a 1N NaOH aqueous solution, to prepare 1.0 ml of a 10 wt % PAA solution. Alternatively, a hydroxypropylated polyrotaxane prepared in a manner similar to Example 4 ($Mw_{PEG}$: 500,000; degree of hydroxypropylation: 35%; degree of inclusion: 29%) was dissolved in a 1N NaOH aqueous solution, to prepare a 10 wt % hydroxypropylated polyrotaxane solution. To 1.0 ml of the PAA solution was added 10 μL of the hydroxypropylated polyrotaxane solution, and mixed. To the resulting mixture was added 20 μL of 1,4-butanediol glycidyl ether, and then allowed to stand at temperature of 50° C. for 20 hours, to obtain a gelated body of a mixture of PAA and the hydroxypropylated polyrotaxane (Weight ratio of PAA to the hydroxypropylated polyrotaxane =100:1).

EXAMPLE 8

<Preparation of the Material According to the Present Invention>

Collagen was dissolved in a 0.03N NaOH aqueous solution, to prepare 1.0 ml of a 2 wt % collagen solution. Alternatively, a methylated polyrotaxane prepared in a manner similar to Example 1 ($Mw_{PEG}$: 35,000; degree of methylation: 30%; degree of inclusion: 29%) was dissolved in a 0.03N NaOH aqueous solution, to prepare a 2 wt % methylated polyrotaxane solution. To 0.5 ml of the collagen solution was added 0.5 ml of the methylated polyrotaxane solution, and mixed. To the resulting mixture was added 10 μL of DVS, and then allowed to stand at temperature of 25° C. for 20 hours, to obtain a gelated body of a mixture of collagen and the methylated polyrotaxane (Weight ratio of collagen to the methylated polyrotaxane=1:1).

EXAMPLE 9

<Preparation of the Material According to the Present Invention>

Collagen was dissolved in a 0.03N NaOH aqueous solution, to prepare 1.0 ml of a 2 wt % collagen solution. Alternatively, a hydroxypropylated polyrotaxane prepared in a manner similar to Example 4 ($Mw_{PEG}$: 500,000; degree of hydroxypropylation: 35%; degree of inclusion: 29%) was dissolved in a 0.03N NaOH aqueous solution, to prepare a 2 wt % hydroxypropylated polyrotaxane solution. To 1 ml of the collagen solution was added 25 μL of the hydroxypropylated polyrotaxane solution, and mixed. To the resulting mixture was added 10 μL of DVS, and then allowed to stand at temperature of 25° C. for 20 hours, to obtain a gelated body of a mixture of collagen and the hydroxypropylated polyrotaxane (Weight ratio of collagen to the hydroxypropylated polyrotaxane=40:1).

COMPARATIVE EXAMPLE 3

For comparison with Examples 8 and 9, gelation using collage was carried out. Collagen was dissolved in a 0.03N NaOH aqueous solution, to prepare 1.0 ml of a 2 wt % collagen solution. To the solution was added 10 μL of DVS, and then allowed to stand at temperature of 25° C. for 20 hours, to obtain a gelated body of collagen.

The resulting gelated body was very fragile as compared with the gelated bodies of Examples 8 and 9, and was broken when touched with a hand. On the other hand, the gelated bodies of Examples 8 and 9 had elasticity and were not broken easily by touch. This teaches that the strength of the gelated body was improved by the presence of polyrotaxane.

EXAMPLE 10

<Preparation of the Material According to the Present Invention>

Hydroxyethyl cellulose (hereinafter may be abbreviated as "HEC") was dissolved in a 0.03N NaOH aqueous solution, to prepare 1.0 ml of a 5 wt % HEC solution. Alternatively, a methylated polyrotaxane prepared in a manner similar to Example 1 ($Mw_{PEG}$: 35,000; degree of methylation: 30%; degree of inclusion: 29%) was dissolved in a 0.03N NaOH aqueous solution, to prepare a 5 wt % methylated polyrotaxane solution. To 1 ml of the HEC solution was added 0.1 ml of the methylated polyrotaxane solution, and mixed. To the resulting mixture was added 10 μL of DVS, and then allowed to stand at temperature of 25° C. for 20 hours, to obtain a gelated body of a mixture of HEC and the methylated polyrotaxane (Weight ratio of HEC to the methylated polyrotaxane=10:1).

EXAMPLE 11

<Preparation of the Material According to the Present Invention>

Hydroxypropyl cellulose (abbreviated as "HPC") was dissolved in a 0.03N NaOH aqueous solution, to prepare 1.0 ml of a 5 wt % HPC solution. Alternatively, a hydroxypropylated polyrotaxane prepared in a manner similar to Example 4 ($Mw_{PEG}$: 500,000; degree of hydroxypropylation: 35%; degree of inclusion: 29%) was dissolved in a 0.03N NaOH aqueous solution, to prepare a 5 wt % hydroxypropylated polyrotaxane solution. To 1 ml of the HPC solution was added 10 μL of the hydroxypropylated polyrotaxane solution, and mixed. To the resulting mixture was added 10 μL of DVS, and then allowed to stand at temperature of 25° C. for 20 hours, to obtain a gelated body of a mixture of HPC and the hydroxypropylated polyrotaxane (Weight ratio of HPC to the hydroxypropylated polyrotaxane=100:1).

EXAMPLE 12

A hydroxypropylated polyrotaxane was prepared in a manner similar to Example 3.

<Introduction of Methacryloyl Group into Hydroxypropylated Polyrotaxane>

3 g of the hydroxypropylated polyrotaxane obtained above was dissolved in 30 ml of DMSO, and to the resulting solution was added 0.06 g of 2-isocyanatoethyl methacrylate. After stirring for 24 hours, the reaction solution was dialyzed through a dialysis tube (fractional molecular weight: 12,000) for 12 hours under flowing tap water. Further, dialysis for 12 hours was repeated twice in 2000 ml of purified water, and then freeze-dried, to give a methacryloylated polyrotaxane in which a part of OH groups in an α-CD molecule was substituted with a methacryloyloxyethylcarbamoyl group (degree of introduction: 1.5% for the hydroxyl groups). The yielded amount was 2.5 g. $^1$H-NMR, (DMSO-$d_6$, 400 MHz) δ (ppm), 1.0 (s, 31H), 1.9 (s, 0.8H), 3.0-4.2 (m, 92H), 4.3-6.2 (m, 25H).

<Introduction of Methacryloyl Group into Polyvinyl Alcohol>

5 g of PVA (degree of polymerization: 500) was dissolved in 50 ml of DMSO, and to the resulting solution was added 0.35 g of 2-isocyanatoethyl methacrylate. After stirring for 6 hours, the reaction solution was dialyzed through a dialysis tube (fractional molecular weight: 12000) for 12 hours under flowing tap water. Further, dialysis for 12 hours was repeated twice in 2000 ml of purified water, and freeze-dried, to give a methacryloylated PVA in which a part of OH groups in PVA was substituted with a methacryloyloxyethylcarbamoyl group. The yielded amount was 4.5 g.

<Preparation of the Material According to the Present Invention>

10 wt % aqueous solutions of the methacryloylated polyvinyl alcohol (abbreviated as "MAPVA", degree of polymerization: 500) and the methacryloylated polyrotaxane were prepared, respectively. Into 0.9 ml of the MAPVA solution was added 0.1 mL of the methacryloylated polyrotaxane solution, and mixed. To the resulting solution was added 0.01 g of 1-[4-(2-hydroxyethoxy)phenyl]-2-hydroxy-2-methyl-1-propanone, and the mixture was stirred. The mixed solution was irradiated with light using a super high pressure mercury lamp (350 W), to obtain a gelated body of the mixture of MAPVA and methacryloylated polyrotaxane (MAPVA: methacryloylated polyrotaxane (weight ratio)=9:1) in about 30 seconds.

EXAMPLE 13

Methacryloylated polyrotaxane was prepared in a manner similar to Example 12 except that the molecular weight of PEG was 500,000, CD:PEG monomer=29:200 (degree of inclusion: 29%), and a degree of hydroxypropylation was 35%.

<Preparation of Material of the Present Invention>

5 wt % aqueous solutions of methacryloylated polyvinyl alcohol (abbreviated as "MAPVA", degree of polymerization: 500) synthesized in a manner similar to Example 12 and the methacryloylated polyrotaxane ($Mw_{PEG}$: 500,000) were prepared, respectively. Into 0.99 ml of the MAPVA solution was added 0.01 mL of the methacryloylated polyrotaxane solution, and mixed. To the resulting solution was added 0.01 g of 1-[4-(2-hydroxyethoxy)phenyl]-2-hydroxy-2-methyl-1-propanone, and the mixture was stirred. The mixed solution was irradiated with light using a super high pressure mercury lamp (350 W), to obtain a gelated body of the mixture of MAPVA and methacryloylated polyrotaxane (MAPVA: methacryloylated polyrotaxane (weight ratio)=99:1) in about 30 seconds.

EXAMPLE 14

<Preparation of the Material According to the Present Invention>

100 mg of PAA (average molecular weight: 25,000) and 100 mg of methylated polyrotaxane ($Mw_{PEG}$: 35,000, degree of methylation: 30%, degree of inclusion: 29%) prepared in a manner similar to Example 1 were dissolved in 1 ml of DMSO. To the resulting solution were added 20 mg of N-ethyl-N'-(3-dimethylaminopropyl)carbodiimide and 20 μL of diisopropylethylamine, and the mixture was left at room temperature for 5 hours, to obtain a mixed gelated body including crosslinking of PAA and polyrotaxane via an ester bond (PAA:methylated polyrotaxane (weight ratio)=1:1).

What is claimed is that:

1. A material comprising a polyrotaxane and a polymer other than a polyrotaxane, wherein the polyrotaxane comprises a cyclic molecule, a linear molecule which is included in cavities of the cyclic molecule(s) in a skewered manner, and a capping group which is located at each end of the linear molecule to prevent the dissociation of the cyclic molecule(s), and wherein a part of the polyrotaxane and the polymer is bound to each other through the cyclic molecule.

2. The material according to claim 1, wherein at least a part of the polymers is physically and/or chemically crosslinked.

3. The material according to claim 1, wherein a weight ratio of the polyrotaxane to the polymer ((polyrotaxane)/(polymer)) is 1/1000 or more.

4. The material according to claim 1, wherein a backbone chain or side chain of the polymer has at least one selected from the group consisting of a —OH group, a —$NH_2$ group, a —COOH group, an epoxy group, a vinyl group, a thiol group, and a photo-crosslinkable group.

5. The material according to claim 1, wherein the linear molecule is selected from the group consisting of polyethylene glycol, polyisoprene, polyisobutylene, polybutadiene, polypropylene glycol, polytetrahydrofuran, polydimethylsiloxane, polyethylene and polypropylene.

6. The material according to claim 1, wherein the linear molecule has a molecular weight of 10,000 or more.

7. The material according to claim 1, wherein the capping group is selected from the group consisting of dinitrophenyl groups, cyclodextrins, adamantane groups, trityl groups, fluoresceins, pyrenes, substituted benzenes, polycyclic aromatics which may be substituted, and steroids.

8. The material according to claim 1, wherein the cyclic molecule has at least one selected from the group consisting of a —OH group, a —NH2 group, a —COOH group, an epoxy group, a vinyl group, a thiol group, and a photocrosslinkable group.

9. The material according to claim 1, wherein the cyclic molecule is a cyclodextrin molecule which may be substituted.

10. The material according to claim 1, wherein the cyclic molecule is a cyclodextrin molecule which may be substituted, and the cyclodextrin molecule is selected from the group consisting of α-cyclodextrin, β-cyclodextrin and γ-cyclodextrin, and derivatives thereof.

11. The material according to claim 1, wherein the cyclic molecule is α-cyclodextrin which may be substituted, and the linear molecule is polyethylene glycol.

12. The material according to claim 1, wherein the linear molecule has the cyclic molecule(s) included in a skewered manner at an amount of 0.001 to 0.6 of a maximum inclusion amount, which is defined as an amount at which the cyclic molecules can be included at maximum when the linear molecule has the cyclic molecules included in a skewered manner, and the amount at maximum is normalized to be 1.

13. The material according to claim 1, wherein the polymer and the cyclic molecule in the polyrotaxane are chemically bound each other by a crosslinking agent.

14. The material according to claim 1, wherein the crosslinking agent has a molecular weight of less than 2,000.

15. The material according to claim 1, wherein the crosslinking agent is selected from the group consisting of cyanuric chloride, trimesoyl chloride, terephthaloyl chloride, epichlorohydrin, dibromobenzene, glutaraldehyde, phenylene diisocyanates, tolylene diisocyanates, divinylsulfone, 1,1'-carbonyldiimidazole and alkoxysilanes.

16. The material according to claim 1, wherein the material is selected from the group consisting of optical materials, contact lenses, biomaterials, medical materials, tire materials, application agents and adhesives.

17. A method for preparing a material which comprises polyrotaxane and a polymer other than a polyrotaxane comprising the steps of:
   a) mixing the polymer and the polyrotaxane which comprises a cyclic molecule, a linear molecule which is included in cavities of the cyclic molecules in a skewered manner, and a capping group which is located at each end of the linear molecule to prevent the dissociation of the cyclic molecules;
   b) physically and/or chemically crosslinking at least a part of the polymer; and
   c) binding the at least a part of the polymer and the polyrotaxane through the cyclic molecule(s).

18. The method according to claim 17, wherein at least part of the polymer is chemically crosslinked in the step b).

19. The method according to claim 17, wherein the step c) is earned out after the step b).

20. The method according to claim 17, wherein the step c) is carried out prior to the step b).

21. The method according to claim 17, wherein the steps b) and c) are earned out at the substantially same time.

22. A method for preparing a material which comprises polyrotaxane and a polymer other than a polyrotaxane comprising the steps of:
   a) mixing a monomer constructing the polymer and the polyrotaxane which comprises a cyclic molecule, a linear molecule which is included in cavities of the cyclic molecules in a skewered manner, and a capping group which is located at each end of the linear molecule to prevent the dissociation of the cyclic molecules;
   b) polymerizing the monomer to form the polymer;
   c) physically and/or chemically crosslinking at least a part of the polymer; and
   d) binding the at least part of the polymer and the polyrotaxane through the cyclic molecule(s).

23. The method according to claim 22, wherein at least part of the polymer is chemically crosslinked in the step c).

24. The method according to claim 22, wherein the steps b) and c) are carried out at the substantially same time.

25. The method according to claim 22, wherein the steps c) and d) are carried out at the substantially same time.

26. The method according to claim 22, wherein the steps b), c) and d) are carried out at the substantially same time.

27. The method according to claim 22, wherein the step d) is carried out prior to the step c).

28. The method according to claim 22, wherein the step d) is carried out after the step c).

* * * * *